United States Patent
Sawant et al.

(10) Patent No.: US 10,692,074 B2
(45) Date of Patent: Jun. 23, 2020

(54) SECURE RESOURCE SHARING BETWEEN COMPUTING DEVICES FOR ELECTRONIC TRANSACTIONS

(71) Applicant: CA, Inc., New York, NY (US)

(72) Inventors: Yashwant Ramkishan Sawant, Parbhani (IN); Banisetti Sandeep, Srikakulam (IN); Mohammed Mujeeb Kaladgi, Bangalore (IN); Ruqiya Nikhat Kaladgi, Bangalore (IN)

(73) Assignee: CA TECHNOLOGIES, INC., New York, NY (US)

( * ) Notice: Subject to any disclaimer, the term of this patent is extended or adjusted under 35 U.S.C. 154(b) by 648 days.

(21) Appl. No.: 15/296,747

(22) Filed: Oct. 18, 2016

(65) Prior Publication Data

US 2018/0108007 A1 Apr. 19, 2018

(51) Int. Cl.
*G06Q 20/36* (2012.01)
*H04L 9/32* (2006.01)
*G06Q 20/38* (2012.01)
*G06Q 20/32* (2012.01)

(52) U.S. Cl.
CPC ..... *G06Q 20/3674* (2013.01); *G06Q 20/3255* (2013.01); *G06Q 20/3829* (2013.01); *G06Q 2220/00* (2013.01)

(58) Field of Classification Search
CPC ........... G06Q 20/3674; G06Q 20/3255; G06Q 20/3827; G06Q 20/3829
USPC ....................................................... 705/71
See application file for complete search history.

(56) References Cited

U.S. PATENT DOCUMENTS

2011/0251892 A1* 10/2011 Laracey
2014/0032394 A1    1/2014 Liberty et al.
2015/0039889 A1*  2/2015 Andoni
2015/0334097 A1* 11/2015 Mundhra et al.
2016/0034900 A1*  2/2016 Nelsen et al.
2016/0117680 A1*  4/2016 Priel et al.
2018/0322497 A1* 11/2018 Lewis

FOREIGN PATENT DOCUMENTS

WO    2014087206    6/2014

* cited by examiner

*Primary Examiner* — James D Nigh
*Assistant Examiner* — Yin Y Choi
(74) *Attorney, Agent, or Firm* — Shook, Hardy & Bacon L.L.P.

(57) ABSTRACT

Techniques are disclosed relating to authorization of asset sharing for transactions by other user accounts. In some embodiments, an apparatus is configured to transmit a request to a mobile device on behalf of a first user account. In some embodiments, the apparatus is configured to receive, from the mobile device in response to the request, an electronic message in a format recognized by an authorization computing system. In some embodiments, the electronic message includes a constraint for a transaction, a replenishment key, and a hash value generated based on at least a portion of other information in the message. In some embodiments, the apparatus is configured to transmit the electronic message for communication to the authorization computing system. In some embodiments, the apparatus is configured to receive transaction authorization based on a comparison of the hash value in the electronic message and a copy of the hash value from the mobile device.

16 Claims, 8 Drawing Sheets

*300*

Request Loan For This Transaction

User to contact: — 310

Amount of transaction: — 320

$999.99

Comments: — 330

Loan Funds to Another User

Requesting user:

John Doe

Amount of transaction:

$999.99

Recipient:

Merchant A

Select source of funds ▽ 410

Add restriction(s) ▽ 420

```
┌─────────────────────────────────────────────────────────────────────┐
│ Receive, from another computing device, a request for funds for a   │
│ payment transaction                                                  │
│ 560                                                                  │
└─────────────────────────────────────────────────────────────────────┘
                                    ↓
┌─────────────────────────────────────────────────────────────────────┐
│ In response to the request, generate a hash of at least a portion of │
│ other information to be included in an electronic message            │
│ 565                                                                  │
└─────────────────────────────────────────────────────────────────────┘
                                    ↓
┌─────────────────────────────────────────────────────────────────────┐
│ In response to the request, generate the electronic message, which   │
│ includes information that specifies:                                 │
│   o  An amount of funds                                              │
│   o  A replenishment key                                             │
│   o  The hash value                                                  │
│ 570                                                                  │
└─────────────────────────────────────────────────────────────────────┘
                                    ↓
┌─────────────────────────────────────────────────────────────────────┐
│ Transmit the electronic message to the other computing device        │
│ 575                                                                  │
└─────────────────────────────────────────────────────────────────────┘
                                    ↓
┌─────────────────────────────────────────────────────────────────────┐
│ Transmit the hash value to an issuer system, where the hash value is │
│ usable by the issuer system for comparison with a hash value         │
│ received from the other computing device to determine whether to     │
│ authorize a payment transaction from the other computing device      │
│ that uses the electronic message                                     │
│ 580                                                                  │
└─────────────────────────────────────────────────────────────────────┘
```

*FIG. 5B*

SECURE RESOURCE SHARING BETWEEN COMPUTING DEVICES FOR ELECTRONIC TRANSACTIONS

BACKGROUND

Technical Field

This disclosure relates generally to electronic communications and more particularly to secure authorization of asset sharing for transactions by other user accounts.

Description of the Related Art

Various applications are available for performing electronic payment transactions using mobile computing devices. Often, these applications act as a virtual wallet, allowing users to store information for different transaction instruments (e.g., credit cards) and/or maintain a balance on a server. A user may then select from among available payment options when performing a payment transaction (e.g., via a point-of-sale device or a website, for example). In certain situations, a user may not have enough funds for a particular transaction in a mobile wallet application and may wish to borrow funds from another user. Transaction security may be important in this scenario to prevent unauthorized individuals from accessing payment information or diverting funds.

SUMMARY

Techniques are disclosed relating to authorization of asset sharing for transactions by other user accounts. In some embodiments, an apparatus includes one or more processing elements configured to transmit a request to a mobile device on behalf of a first user account. The mobile device may be a device of a friend, for example. In some embodiments, the apparatus is configured to receive, from the mobile device in response to the request, an electronic message in a format recognized by an authorization computing system. The authorization computing system may be configured to store account information for the friend, for example. In some embodiments, the electronic message includes a constraint for a transaction, a replenishment key for sharing resources with other user accounts, and a hash value generated based on at least a portion of other information in the message. In some embodiments, the apparatus is configured to transmit the electronic message for communication to the authorization computing system, e.g., via one or more intermediate systems. In some embodiments, the apparatus is configured to receive a transaction authorization from the authorization computing system, where the transaction authorization is generated based on a comparison of the hash value in the electronic message and a copy of the hash value transmitted to the authorization computing system by the mobile device.

In some embodiments, disclosed techniques may be used to loan funds to other users for particular transactions. For example, in some embodiments a device is configured to receive, from a second device, a request for funds for a payment transaction. In some embodiments, the device is configured to generate a hash value in response to the request and generate an electronic message that includes information that specifies an amount of funds, a replenishment key, and the hash value. The electronic message may also specify payment information (e.g., information specifying a payment account and authentication information for the payment account). In some embodiments, the device is configured to transmit the electronic message to the second computing device and transmit the hash value to an issuer system. In some embodiments, the hash value is usable by the issuer system for comparison with a hash value received from the second computing device to determine whether to authorize a payment transaction from the second computing device that uses the electronic message.

In various embodiments, an authorization system may be configured to receive the electronic message (including the hash value) and a copy of the hash value from the lending device, compare the hash values, and determine whether to authorize a transaction based on the comparison. In various embodiments, the disclosed techniques may allow loaning funds for a transaction without actually transferring funds between users. Further, the disclosed techniques may not require a centralized server to set up a loan. In various embodiments, the disclosed techniques may provide secure transactions to prevent misappropriation of funds.

BRIEF DESCRIPTION OF THE DRAWINGS

FIG. 3 is a diagram illustrating an exemplary interface for requesting a loan for a transaction, according to some embodiments.

FIG. 4 is a diagram illustrating an exemplary interface for loaning funds to another account, according to some embodiments.

FIG. 5B is a flow diagram illustrating an exemplary method for issuing a loan for a transaction, according to some embodiments.

Figure 1:
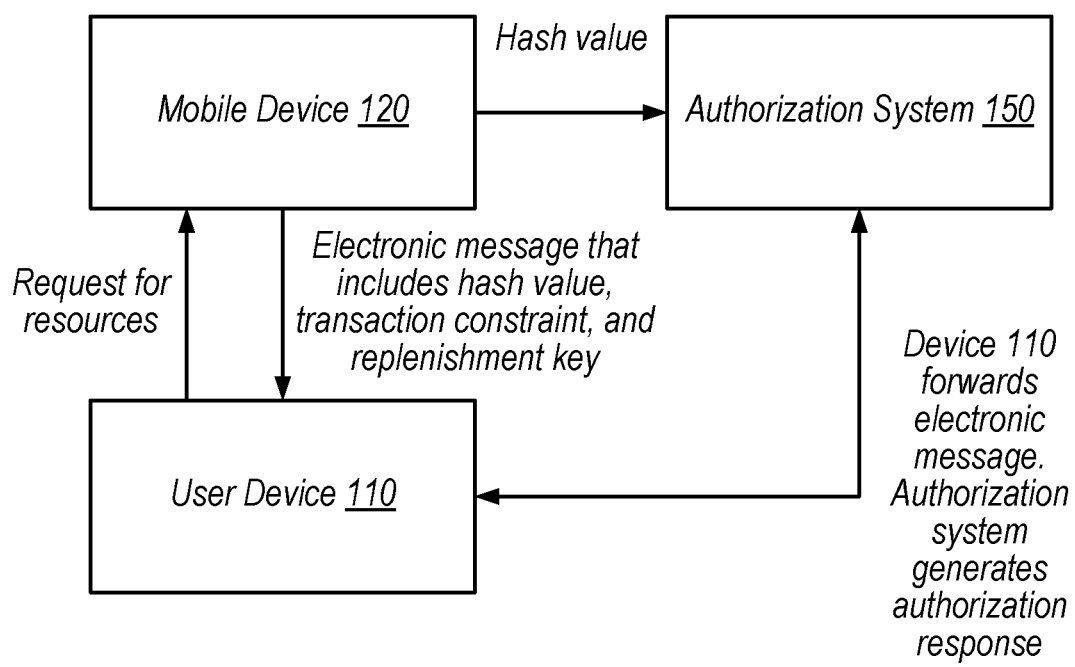
FIG. 1 is a block diagram illustrating exemplary communications between user devices and an authorization system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Exemplary System

FIG. 1 is a block diagram illustrating exemplary communications between devices, according to some embodiments. In some embodiments, the disclosed techniques may allow secure communication of information for sharing resources, e.g., for loaning funds for an electronic payment transaction.

FIG. 1 shows a user device 110, a mobile device 120, and an authorization system 150, in the illustrated embodiment. Elements of FIG. 1 may communicate via any of various appropriate wired and/or wireless electronic communications networks. As one example, each mobile device 110 or 120 may communicate with a cellular wireless base station and/or wireless local area network (WLAN) access point to communicate with a network connected to authorization system 150. In some embodiment, devices 110 and 120 are mobile phones, but devices 110 and 120 may be implemented using any of various appropriate devices in other embodiments. In some embodiments, device 110 is configured to loan funds to device 120 for a payment transaction, based on authorization from authorization system 150.

Device 110, in the illustrated embodiment, sends a request for resources to mobile device 10. For example, the request may be for a loan of funds to perform a payment transaction. In other embodiments, the request may be for non-monetary resources such as physical access, access to a file, access to security information, access to a network, etc.

Device 120, in the illustrated embodiment, is configured to respond with an electronic message that includes: a hash value, a transaction constraint, and a replenishment key. The replenishment key may be issued to device 120 by authorization system 150 specifically for transactions by other devices using loaned funds from device 120 (thus, authorization system 150 may issue other replenishment key(s) for transactions by device 120). The constraint may be an amount of loaned funds, for example. Device 120, in some embodiments, is configured to generate the hash value by performing a hash function on other information included in the electronic message (e.g., on the constraint and the replenishment key). In some embodiments, device 120 may include secure storage hardware (e.g., separate memory structures) configured to store replenishment keys such that they are not available to other applications, e.g., to prevent unauthorized access to the replenishment keys. In some embodiments, the electronic message may include additional information that may be used for the transaction by user device 110, such as payment account information for an account of a user of device 120, for example. In the illustrated embodiment, device 120 is also configured to send a copy of the hash value to authorization system 150.

As used herein, the term "hash function" is intended to be construed according to its well-understood meaning to those skilled in the art, which includes a function that maps input data of an arbitrary size to an output hash value of a fixed size. In various embodiments, cryptographic hash functions are implemented such that if the input data is unknown, it is difficult to reconstruct the input data from the output hash value. In various embodiments, hash functions are used where there is a low (or zero, for perfect hashing) likelihood that two different input values produce the same output hash value. Non-limiting examples of hash functions include the MD5 algorithm and versions of the secure hash algorithm (SHA). In other embodiments, any of various hashing functions may be implemented.

Authorization system, in the illustrated embodiment, receives the electronic message (forwarded by user device 110) and the hash value from device 120. In some embodiments, authorization system 150 is configured to compare the hash value in the electronic message with the copy of the hash value received from mobile device 120. In some embodiments, authorization system 150 is configured to generate an authorization response based on the comparison (e.g., authorizing the transaction if the hash values match and any other criteria are met) and send the authorization response to user device 110 (note that one or more intermediate systems may receive the authorization response and notify device 110 of the response, rather than the response being transmitted directly to device 110).

Exemplary Payment System

Figure 2:
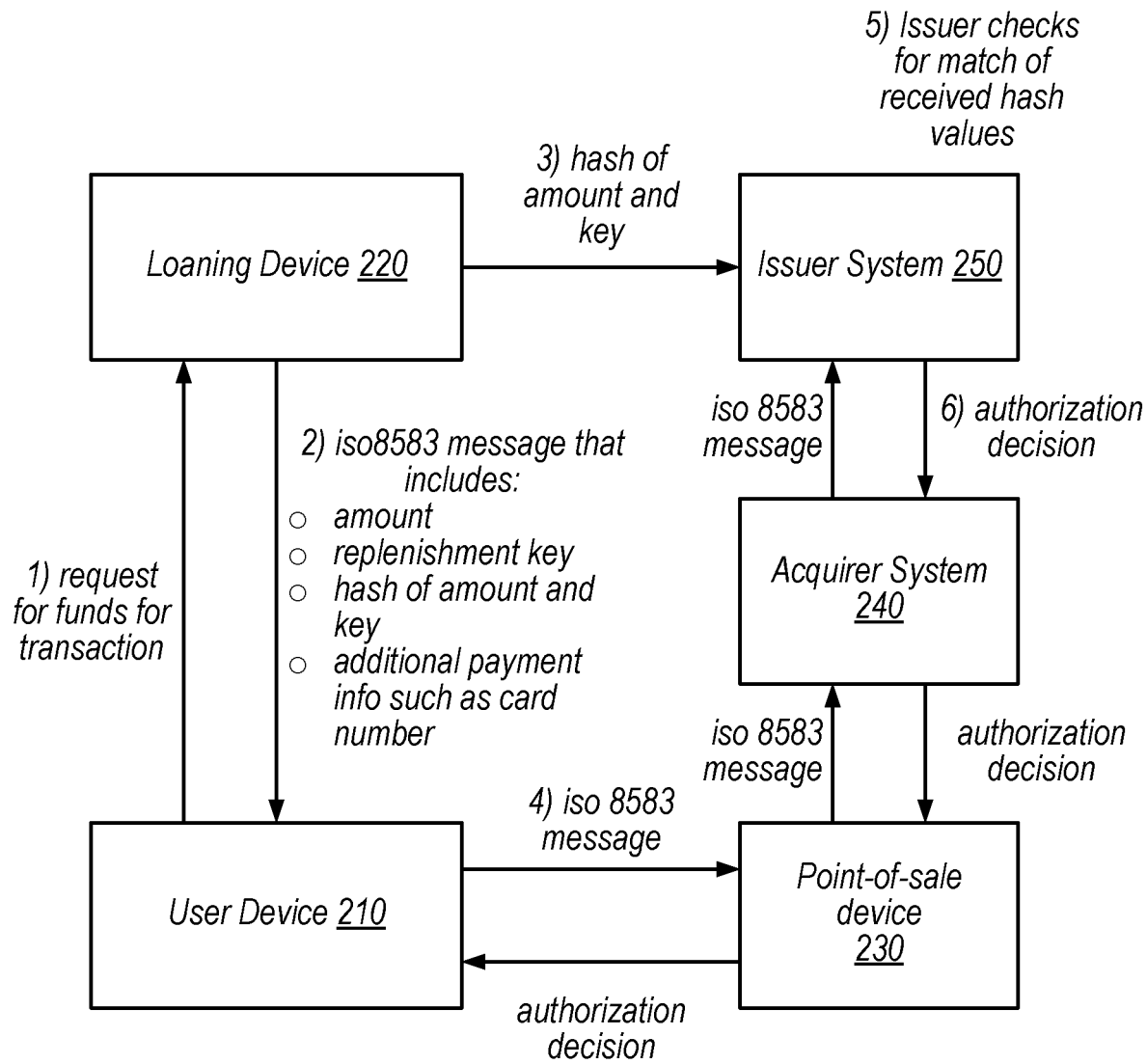
FIG. 2 is a block diagram illustrating exemplary communications in a system for performing payment transactions, according to some embodiments.

FIG. 2 is a block diagram illustrating an exemplary system configured to perform payment transactions using loaned funds, according to some embodiments. In the illustrated embodiment, the system includes user device 210, loaning device 220, point-of-sale (POS) device 230, acquirer system 240, and issuer system 250. In some embodiments, user device 210 is configured similarly to user device 110, loaning device 220 is configured similarly to mobile device 120, and issuer system 250 is configured similarly to authorization system 150.

User device 210, in the illustrated embodiment is configured to send a request for funds for a transaction to loaning device 220. An exemplary interface that may be used to make such a request is discussed in further detail below with reference to FIG. 3. In the illustrated embodiment, user device 210 receives an iso8583 message in response. Iso8583 messages are discussed herein for purposes of explanation, but any of various formats of electronic messages may be implemented in other embodiments, where the formats are recognized by issuer system 250.

Loaning device 220, in the illustrated embodiment, is configured to generate the iso8583 message and send a hash of an amount and a replenishment key to issuer system 250. In other embodiments, the hash may be generated using other information in the iso8583 message (and/or other information that is not in the message such as private key information, for example) as input. In some embodiments, issuer system 250 is configured to assign the replenishment key to loaning device 220 and indicates to loaning device 220 that the replenishment key is for transactions in which funds are loaned to other devices. In the illustrated embodiment, the iso8583 message includes an amount of loaned funds (which may correspond to the amount of the payment transaction requested by user device 210 or a portion thereof), the replenishment key, the hash of the amount and key, and additional information such as a card number. In some embodiments, the card number may be used to access a payment account associated with the card number to perform the payment transaction.

In the illustrated embodiment, user device 210 transmits the iso8583 message for communication to issuer system 250 via POS device 230 and acquirer system 240. In some embodiments, user device 210 connects with POS device 230 via an NFC connection. Elements 230 and 240 are examples of intermediate devices through which user device 210 may forward an electronic message. In other embodiments, any of various intermediate systems may be implemented. In the illustrated embodiments, POS device 230 and acquirer system 240 are configured to process messages in the iso8583 format, which may allow existing intermediate systems to be used to implement the disclosed techniques.

POS device 230 may be configured to communicate with user device 210 via a short-range wireless interface, for example, and may be implemented by a merchant receiving payment in the payment transaction. Acquirer system 240, in some embodiments, is a system implemented by a bank at which the merchant has an account and is configured to route the iso8583 message to issuer system 250 based on the card information or other information identifying an account of the user of loaning device 220, for example.

Issuer system 250, in the illustrated embodiment, is configured to check for a match of the received hash values and determine whether to authorize the transaction based at least in part on whether there is a match. For example, issuer system 250 may deny the transaction in response to lack of a match. Issuer system 250, in some embodiments, is configured to determine whether to authorize the transaction based on additional information such as whether a user of loaning device 220 has sufficient funds for the transaction, whether the transaction meets with one or more constraints, etc. In the illustrated embodiment, issuer system 250 is configured to transmit an authorization decision to POS device 230 and user device 210 (note that the same electronic message may not be sent for each instance of the authorization decision shown in FIG. 2; rather the intermediate systems may or may not process or modify the authorization decision before forwarding information indicating whether the transaction was authorized). In some embodiments, issuer system 250 is also configured to notify loaning device 220 of the authorization decision.

In some embodiments, user device 210 and/or user device 220 are configured to notify their respective users when the payment transaction has been successfully completed or has failed.

In some embodiments, devices 210 and 220 are configured to communicate using encryption, e.g., via a secure sockets layer (SSL) connection. In some embodiments, devices 210 and 220 are configured to communicate via a direct wireless connection (e.g., an NFC connection) that does not utilize any intermediate devices such as access points or base stations. This may require devices 210 and 220 to be in physical proximity, which may reduce likelihood that information in the iso8583 message will be intercepted by unauthorized parties. In other embodiments, other communication mechanisms may be used between devices 210 and 220, including for example: WiFi, WiFi Direct, Bluetooth, a connection via the Internet, cellular connections, etc.

In some embodiments, devices 210 and 220 are configured with a mobile wallet application and are configured to receive user input via the application and use the application to transmit various messages discussed herein. In some embodiments, an authentication system (not explicitly shown) may confirm login credentials for users of device 210 and 220 before allowing these devices to transmit various messages discussed herein. In some embodiments, a server of an entity associated with the application is included as an intermediate system between the POS device 230 and issuer system 250. This may allow the server to record details of transactions such as those shown in FIG. 2. In some embodiments, rather than using a credit card or other payment account, loaning device 220 may loan funds that have already been transferred into a mobile wallet account. In these embodiments, the server may be configured to perform one or more actions described as being performed by issuer system 250 for a payment transaction.

In various embodiments, disclosed techniques may advantageously allow users to securely loan funds for payment transactions without requiring modifications to existing infrastructure. Further, in various disclosed embodiment, money is not actually transferred from the lender to the recipient. Rather, the lender's payment account may be used to make a payment for a transaction by the recipient. Thus, disclosed techniques may allow loaning users to ensure that funds are loaned for a particular transaction rather than being generally available for other uses. This may be desirable in various contexts, e.g., when the lending user is a parent or employer that only wants to loan funds for specific purposes. Further, the disclosed techniques may not require a centralized server to set up loan transactions. Rather, the devices of the lender and recipient may communicate directly to confirm loan details and the recipient sends a transaction message to an authorization server already associated with the lending device.

Exemplary User Interfaces

FIG. 3 is a diagram illustrating an exemplary user interface 300 that may be used to request a loan for a transaction, according to some embodiments. The illustrated interfaces in FIG. 3 and FIG. 4 are shown for purposes of explanation, but are not intended to limit the scope of the present disclosure. In the illustrated embodiment, the interface 300 includes an input field 310 that allows a user to enter one or more users to contact to request funds. In some embodiments, the interface 300 is configured to suggest contacts, e.g., from a contact application installed on device 210, based on previous requests, etc. In the illustrated embodiment, the interface 300 also includes a field 320 indicating the amount of the transaction and a field 330 for any comments. In some embodiments, field 320 is populated based on communications with POS device 230, which may specify the amount of the payment transaction. The comments field may be used to send a message to the user being contacted, e.g., to say "Can you loan me funds for a minor emergency? I will be able to pay you back next week." In some embodiments, the user may be able to select from among pre-generated or previously-used comments rather than manually entering a comment.

FIG. 4 is a diagram illustrating an exemplary user interface 400 that may be used to issue a loan for a transaction, according to some embodiments. In the illustrated embodiment, the interface 400 identifies the requesting user ("John Doe" in the illustrated example), an amount of the transaction ($999.99 in the illustrated example) and a recipient for the corresponding payment transaction. In some embodiments, issuer system 250 or some other system is configured with a list of trusted merchants and is configured to confirm that the transaction is being performed with a merchant on the list (and indicate the confirmation via interface 400). This may prevent fraud, e.g., by preventing the user requesting funds from pretending that a transaction is being performed at a grocery store when in fact is it being performed at an illicit establishment.

In some embodiments, (not explicitly shown) the interface 400 may allow the loaning user to alter the amount of the transaction, e.g., to loan funds for only a portion of the transaction. The amount of the transaction may be referred to as a payment amount constraint.

In the illustrated embodiment, interface 400 includes a field 410 that allows the user to select a source of the funds being loaned. Exemplary sources include a payment account (e.g., a credit card account), a bank account, a mobile wallet balance of previously transferred funds, etc. In the illustrated embodiment, interface 400 also includes a field 420 that allows the loaning user to impose one or more restrictions on the transaction. For example, the user may specify that the transaction must occur within a particular physical proximity to a particular location, must occur within a particular time interval, can only occur if a payment account has a threshold amount of funds, etc. In some embodiments, issuer system 250 is configured to determine whether any restrictions are satisfied before authorizing a corresponding transaction.

In some embodiments, a computing system is configured to track loaned funds. For example, the computing system may allow the loaning user to access a list of transactions for which the user has loaned funds. This may facilitate the user in requesting repayment for the loans. Note that use of the term "loan" herein does not imply that repayment is expected. In some embodiments, loans may be repaid, but in other embodiments loans may be made for gift transactions where no repayment is expected. In some embodiments, interface 400 includes one or more fields (not explicitly shown) that allow the lender to indicate whether repayment is expected, whether an interest rate will be imposed, etc. In some embodiments, the computing system is configured to compute updated repayment amounts based on an interest rate and an amount of time since the loan was performed. In some embodiments, interface 300 and/or interface 400 may include fields that allow the users to specify and/or agree to an interest rate for a particular loan. In some embodiments, the computing system is configured to compute periodic repayment amounts in order to repay a loan after a desired time interval. In various embodiments these techniques may reduce confusion and arguments about loan repayment and allow users to use a simple interface to loan funds without worrying about computing repayment amounts.

Exemplary Methods

Figure 5A:
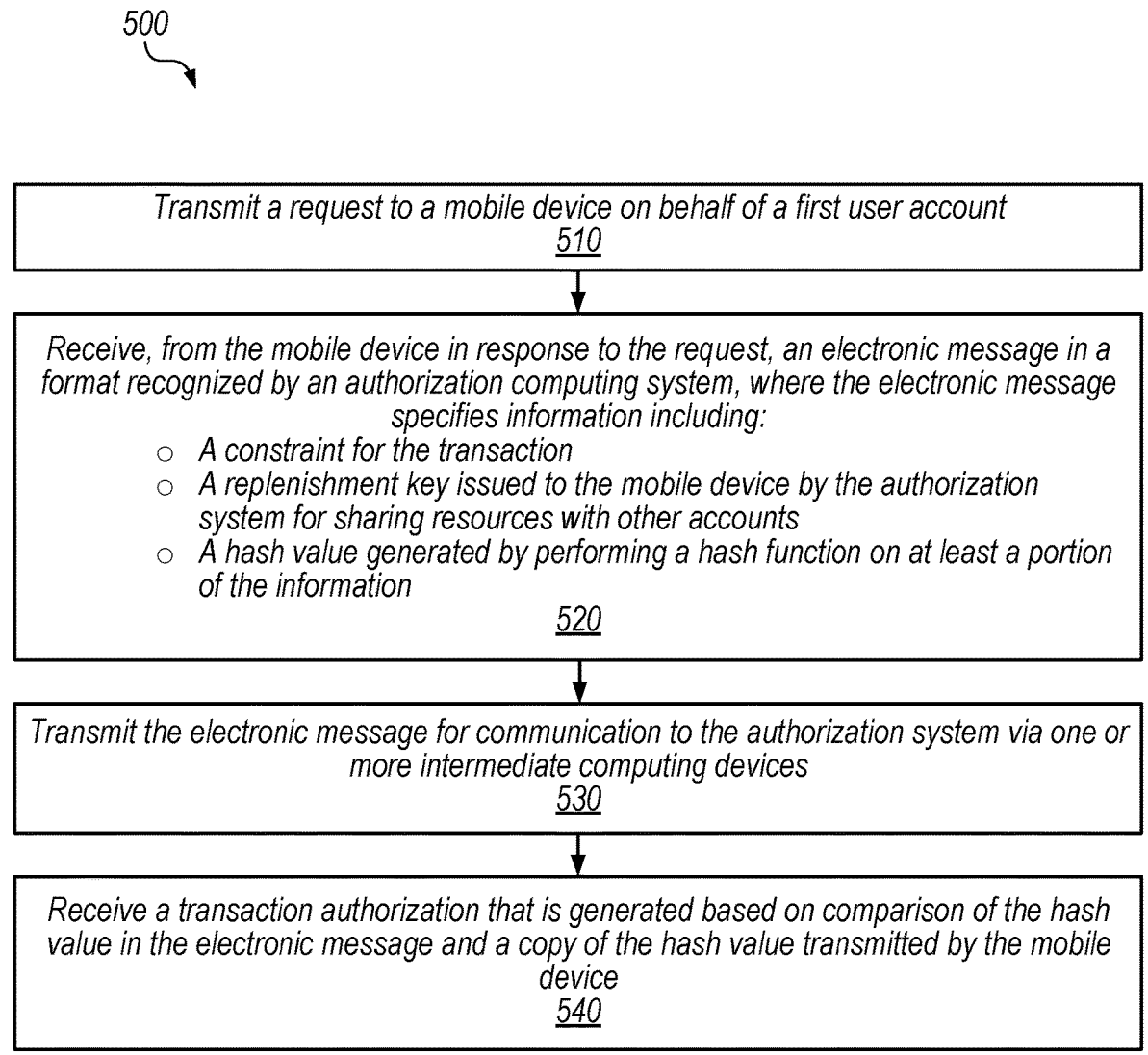
FIG. 5A is a flow diagram illustrating an exemplary method for requesting a loan for a transaction, according to some embodiments.

FIG. 5A is a flow diagram illustrating a method 500 for requesting a loan for a transaction from another user, according to some embodiments. The method shown in FIG. 5A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a computing device (e.g., user device 110 or user device 210) transmits a request to a mobile device (e.g., mobile device 120 or loaning device 220) on behalf of a first user account.

At 520, in the illustrated embodiment, the computing device receives an electronic message in response to the request. In the illustrated embodiment, the electronic message is in a format recognized by an authorization computing system. In the illustrated embodiment, the electronic message specifies information including: a constraint for the transaction (e.g., an approved amount), a replenishment key issued to the mobile device by the authorization system for sharing resources with other accounts, and a hash value generated by performing a hash function on at least a portion of the other information in the electronic message.

At 530, in the illustrated embodiment, the computing device transmits the electronic message for communication to the authorization system via one or more intermediate computing devices.

At 540, in the illustrated embodiment, the computing device receives a transaction authorization that is generated based on comparison of the hash value in the electronic message and a copy of the hash value transmitted by the mobile device.

FIG. 5B is a flow diagram illustrating a method 550 for issuing a loan for a transaction to another user, according to some embodiments. The method shown in FIG. 5B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 560, in the illustrated embodiment, a computing device (e.g., mobile device 120 or loaning device 220) receives, from another computing device, a request for funds for a payment transaction.

At 565, in the illustrated embodiment, the computing device generates a hash value by performing a hash function on least a portion of other information to be included in an electronic message, in response to the request.

At 570, in the illustrated embodiment, the computing device generates the electronic message to include information that specifies at least: an amount of funds, a replenishment key, and the hash value.

At 575, in the illustrated embodiment, the computing device transmits the electronic message to the other computing device.

At 580, in the illustrated embodiment, the computing device transmits the hash value to an issuer system, where the hash value is usable by the issuer system for comparison with a hash value received from the other computing device (e.g., in the electronic message, which may be forwarded from the other computing device to the issuer system) to determine whether to authorize a payment transaction from the other computing device that uses the electronic message.

Figure 6:
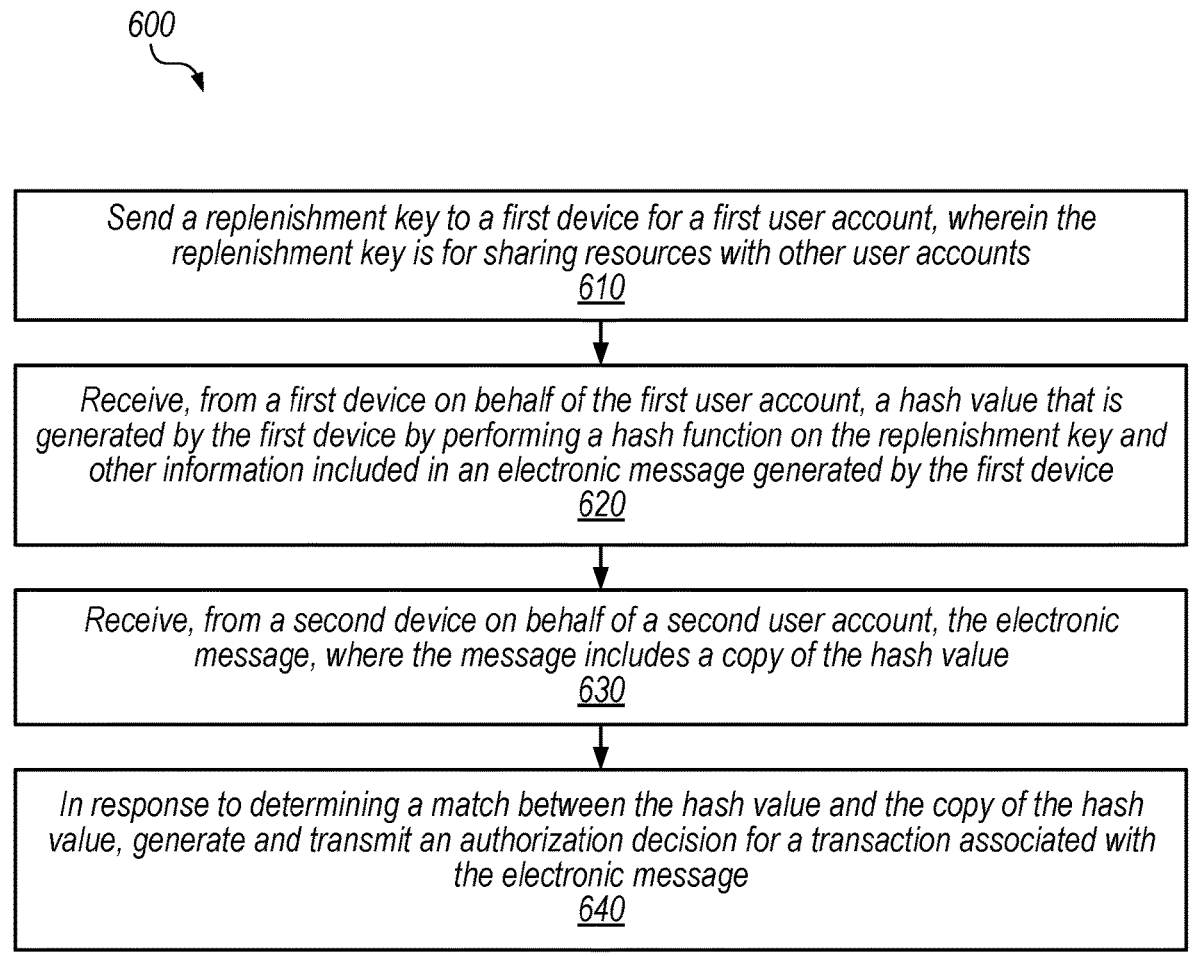
FIG. 6 is a flow diagram illustrating an exemplary server-side method for authorizing a loan for a transaction, according to some embodiments.

FIG. 6 is a flow diagram illustrating a server-side method 600 for authorizing a loan for a transaction, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, an authorization system sends a replenishment key to a first device for a first user account. In the illustrated embodiment, the replenishment key is for sharing resources with other user accounts. In some embodiments, the authorization system also sends other replenishment keys for transactions where resources are not shared with other user accounts. The authorization system may send additional information that specifies which replenishment keys are for loans to other users.

At 620, in the illustrated embodiment, the authorization system receives, from a first device on behalf of the first user account, a hash value that is generated by the first device by performing a hash function on the replenishment key and other information included in an electronic message generated by the first device.

At 630, in the illustrated embodiment, the authorization system receives, from a second device on behalf of a second user account, the electronic message, where the message includes a copy of the hash value.

At 640, in the illustrated embodiment, the authorization system, in response to determining a match between the hash value and the copy of the hash value, generates and transmits an authorization decision for a transaction associated with the electronic message. As discussed above, the result of the authorization decision may be communicated to the second device via one or more intermediate systems.

In some embodiments, any of various operations discussed herein may be performed by executing program instructions stored on a non-transitory computer readable medium. Such program instructions may be executed using one or more of device 110, device 120, and/or authorization system 150, for example. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Exemplary Device

Figure 7:
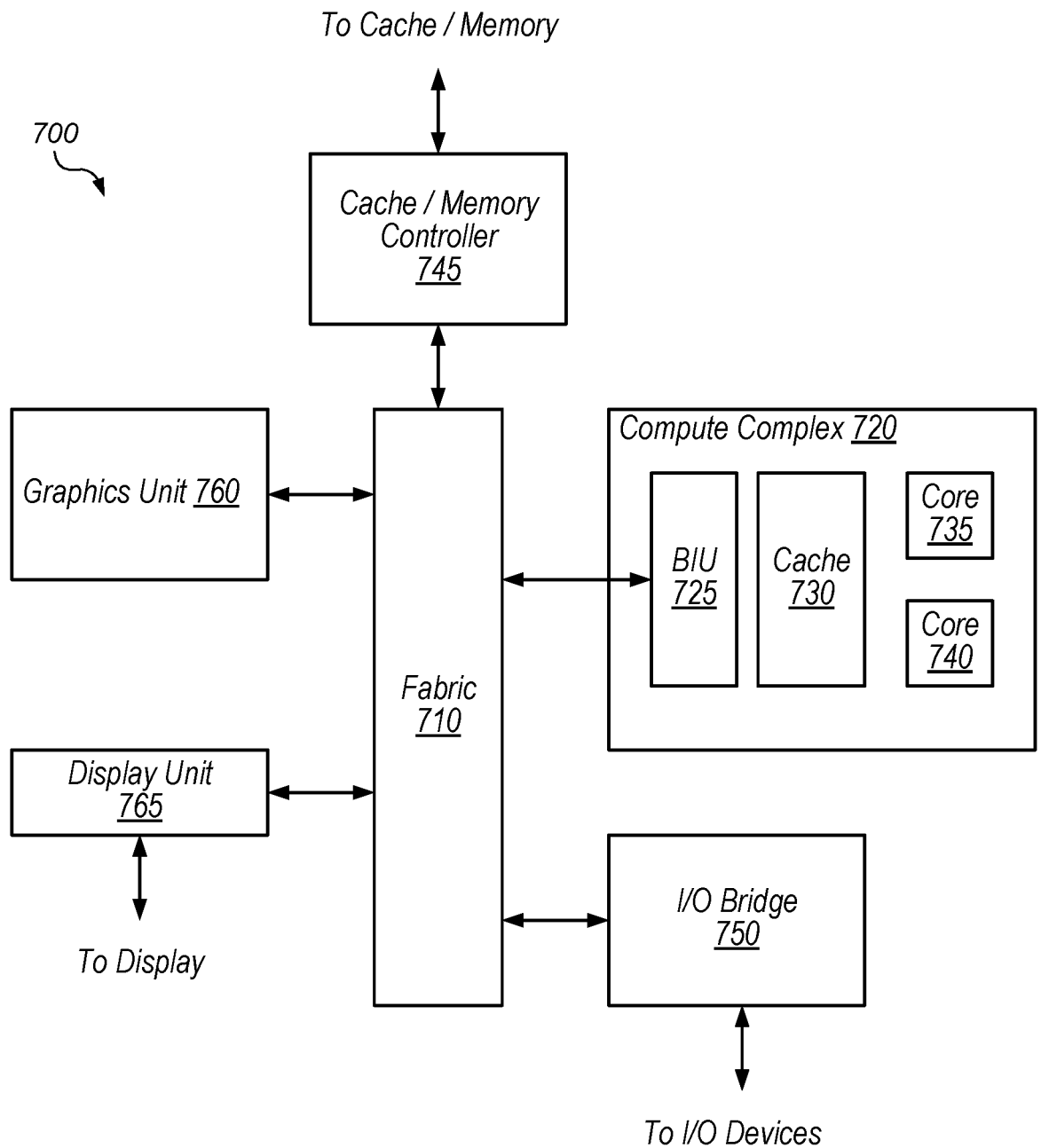
FIG. 7 is a block diagram illustrating an exemplary device, according to some embodiments.

Referring now to FIG. 7, a block diagram illustrating an exemplary embodiment of a device 700 is shown. The illustrated processing elements may be included in devices 110, 120, and/or 150, in some embodiments. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 750, cache/memory controller 745, graphics unit 760, and display unit 765.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 760 may be described as "coupled to" a memory through fabric 710 and cache/memory controller 745. In contrast, in the illustrated embodiment of FIG. 7, graphics unit 760 is "directly coupled" to fabric 710 because there are no intervening elements.

Graphics unit 780 may include one or more processors and/or one or more graphics processing units (GPU's). Graphics unit 780 may receive graphics-oriented instructions, such as OPENGL® or DIRECT3D® instructions, for example. Graphics unit 780 may execute specialized GPU instructions or perform other operations based on the received graphics-oriented instructions. Graphics unit 780 may generally be configured to process large blocks of data in parallel and may build images in a frame buffer for output to a display. Graphics unit 780 may include transform, lighting, triangle, and/or rendering engines in one or more graphics processing pipelines. Graphics unit 780 may output pixel information for display images.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
sending, by an authorization system, a replenishment key to a first mobile device for a first user account, wherein the replenishment key is assigned for sharing resources with other user accounts;
receiving, from the first mobile device on behalf of the first user account, a hash value, wherein the hash value is generated by the first mobile device by performing a hash function on the replenishment key and other information included in an electronic message generated by the first mobile device;
receiving, by the authorization system from a second mobile device on behalf of a second user account, the electronic message, wherein the electronic message includes a copy of the hash value generated by the first mobile device; and
in response to determining a match between the hash value and the copy of the hash value, the authorization system generating and transmitting an authorization decision for a transaction associated with the electronic message.

2. The method of claim 1, wherein the electronic message further includes payment information for the first user account.

3. The method of claim 1, wherein the electronic message further includes an amount constraint for the transaction.

4. The method of claim 1, wherein the electronic message is generated based on a request from the second mobile device to borrow funds for the transaction from a user associated with the first mobile device.

5. The method of claim 1, wherein the authorization system is an issuer computing system and wherein the electronic message is received via a point-of-sale device and an acquirer computing system.

6. The method of claim 1, further comprising: indicating to the first mobile device that the replenishment key is for use in one or more transactions in which funds are loaned to other users.

7. A non-transitory computer-readable medium having instructions stored thereon that are executable by a first mobile computing device to perform operations comprising:
receiving, from a second mobile computing device, a request for funds for a payment transaction; generating, in response to the request, a hash value using a hash function;
generating, in response to the request, an electronic message that includes information that specifies: an amount of funds; a replenishment key; and the hash value, wherein the hash function is performed on the amount of funds and the replenishment key; wirelessly transmitting the electronic message to the second mobile computing device; and transmitting the hash value to an issuer system, wherein the hash value is usable by the issuer system for comparison with a hash value received from the second mobile computing device to determine whether to authorize a payment transaction from the second mobile computing device that use the electronic message.

8. The non-transitory computer-readable medium of claim 7, wherein the information further includes payment account information for a payment account to be used for the payment transaction.

9. The non-transitory computer-readable medium of claim 7, wherein the operations further comprise encrypting the electronic message prior to transmitting the electronic message to the second mobile computing device.

10. The non-transitory computer-readable medium of claim 7, wherein the wirelessly transmitting the electronic message to the second mobile computing device is performed via a direct wireless connection.

11. The non-transitory computer-readable medium of claim 7, wherein the operations further comprise displaying an interface to allow a user to select a source of funds for the amount of funds.

12. A mobile device, comprising: one or more processors configured to: receive, from a second mobile computing device, a request for funds for a payment transaction; generate, in response to the request, a hash value using a hash function; generate, in response to the request, an electronic message that includes information that specifies: an amount of funds; a replenishment key; and the hash value, wherein the hash function is performed on the amount of funds and the replenishment key; wirelessly transmit the electronic message to the second mobile computing device; and transmit the hash value to an issuer system, wherein the hash value is usable by the issuer system for comparison with a hash value received from the second mobile computing device to determine whether to authorize a payment transaction from the second mobile computing device that uses the electronic message.

13. The mobile device of claim 12, wherein the information further includes payment account information for a payment account to be used for the payment transaction.

14. The mobile device of claim 12, wherein the one or more processors are further configured to: encrypt the electronic message prior to transmitting the electronic message to the second mobile computing device.

15. The mobile device of claim 12, wherein the one or more processors are further configured to display an interface to allow a user to select a source of funds for the amount of funds.

16. The mobile device of claim 12, wherein the mobile device is configured to wirelessly transmit the electronic message to the second mobile computing device via a direct wireless connection.

* * * * *